March 9, 1937.  J. H. GREENE  2,073,391
EARTH SCRAPER
Filed Feb. 11, 1936
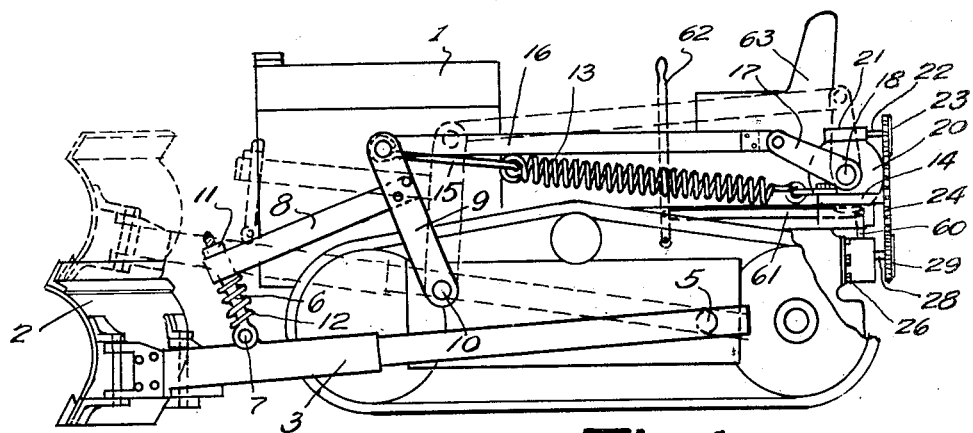
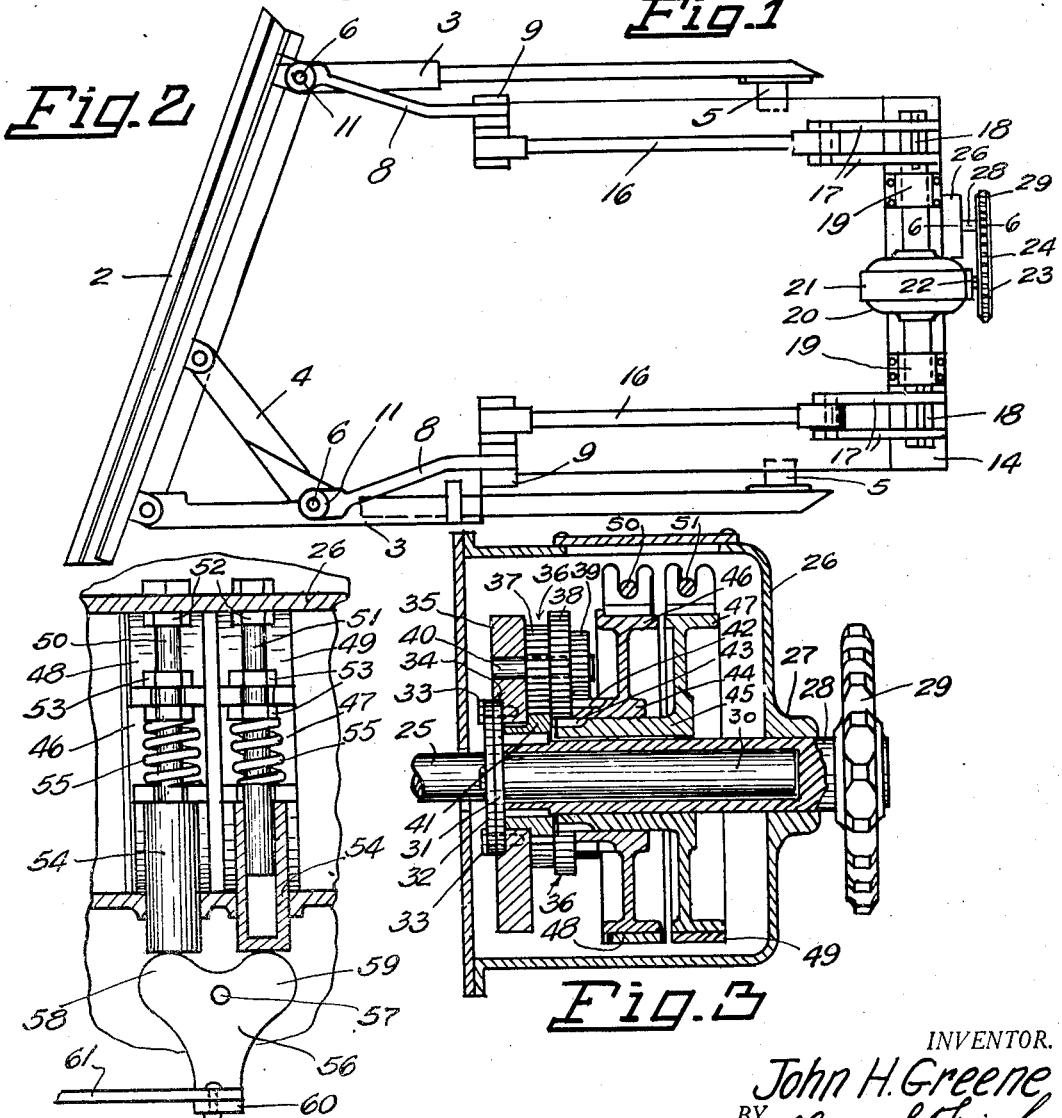
INVENTOR.
John H. Greene
BY
ATTORNEYS.

Patented Mar. 9, 1937

2,073,391

UNITED STATES PATENT OFFICE 2,073,391

EARTH SCRAPER

John H. Greene, Spokane, Wash.

Application February 11, 1936, Serial No. 63,440

4 Claims. (Cl. 37—144)

REISSUED

This invention relates to an improved earth scraper and more particularly to a scraper of the type used for grading roads and fields and filling hollows with soil or other material scraped from high places by a blade mounted at the front of the scraper.

One object of the invention is to provide a scraper so constructed that it may be mounted upon a tractor with the blade in front of the tractor where it will act upon the surface of the road or field as the tractor moves along the same.

Another object of the invention is to provide the scraper with a scraping blade mounted for vertical adjustment relative to the surface of the road or field and having improved means for adjusting the blade and supporting it at a desired elevation.

Another object of the invention is to so construct the adjusting and supporting means for the blade carrying frame that power for effecting vertical adjustment may be obtained from the tractor to which the frame is applied, thus making manual adjustment unnecessary and reducing labor on the part of the operator of the scraper.

Another object of the invention is to provide means for removing strain from the supporting means for the blade carrying frame and preventing damage due to excessive strain when shifting the frame upwardly to elevate the blade.

Another object of the invention is to so construct the scraper that it may be easily applied to a tractor of a conventional construction and not effect the balance of the tractor when applied thereto.

The invention is illustrated in the accompanying drawing, wherein:

Figure 1 is a side elevation showing the scraper applied to a tractor, the blade being shown in a lowered position in full lines and its elevated position being indicated by dotted lines.

Figure 2 is a top plan view of the scraper with parts omitted, for sake of clearness.

Figure 3 is a sectional view upon an enlarged scale taken along the line 6—6 of Figure 2.

Figure 4 is a fragmentary sectional view illustrating the means for tightening the drum encircling bands shown in Figure 3.

This improved scraper or grader, as it may be referred to, may be used for scraping roads, leveling fields, removing snow and the like from highways and streets or for any other purpose for which it is found suitable. It is adapted to be mounted upon a tractor of a conventional construction and it is to be understood that the tractor shown in Figure 1 and indicated in general by the numeral 1 may be of any desired construction and of any size desired. The blade 2 is disposed in front of the tractor transversely thereof at an incline and carries mounting bars 3 which extend rearwardly from adjacent its ends, a brace 4 being provided to maintain the blade at the desired angle. These side arms carry pivots 5 near their rear ends and, from an inspection of Figure 1, it will be apparent that by swinging the side bars about their pivots the blade may be shifted from a lowered position in which it has scraping engagement with the ground to the raised position indicated by dotted lines. Stems or rods 6 are secured at their lower ends to the side bars 3 by fasteners 7 and their upper portions pass through forward portions of arms 8 carried by and projecting forwardly from levers 9, the lower ends of which are pivotally mounted at opposite sides of the tractor as shown at 10. A nut or equivalent fastener 11 retains each arm in engagement with the cooperating stem 6 and a spring 12 is mounted upon each stem to absorb shocks received if the blade encounters an obstruction such as a large rock or the like as the tractor moves across a field. When pull is exerted upon the levers 9 to swing them rearwardly the side bars will be swung upwardly to elevate the blade and the blade will be supported in the vertically adjusted position. Large springs 13 which are anchored at their rear ends to end portions of a cross bar 14 at the rear of the tractor have their front ends connected to links extending rearwardly from upper ends of the levers 9 and upon an inspection of Figure 1 it will be readily seen that pull exerted by the springs will resist forward movement of the levers and thus assist in supporting the weight of the side bars and blade and remove strain from mechanism by which the levers are swung rearwardly and retained in the adjusted positions.

The adjusting mechanism for the levers includes bars 16 which are pivoted at their front ends to upper ends of the levers and extend rearwardly therefrom at opposite sides of the tractor with their rear ends pivoted between ends of lever arms 17 carried by a shaft 18 mounted in bearings 19 and extending longitudinally of the cross bar 14. This shaft carries a worm gear intermediate its length mounted in a housing 20 and rotary motion is imparted to the shaft by a worm mounted in the auxiliary housing 21 at the top of the gear housing 20 and meshing with teeth of the worm gear. The shaft 22 of the worm projects rearwardly from the auxiliary housing or chamber 21 and carries a sprocket wheel 23 and it will be apparent that when rotary motion is transmitted to the shaft 22 by the chain 24 trained about the sprocket 23 the shaft 18 will be rotated and the blade raised or lowered according to the direction in which the shaft 18 is turned. When rotation of the shaft 18 is stopped the levers 9 will remain in the position to which they have been moved and the blade supported either in contact with the ground or in an elevated position. As the springs 13 exert pull upon upper ends of the levers strain upon the shaft 18, companion worm gear and worm, and the chain, will be removed and danger of the chain being broken by the weight of the blade and side bars eliminated.

The power for imparting rotation to the shaft 22 is to be obtained from the power plant of the tractor and upon referring to Figure 3 it will be seen that it is directly obtained from a shaft 25 which may be referred to as a power take-off shaft and projects rearwardly from the tractor frame. A transmission housing 26 is secured in any desired manner to the tractor frame about the shaft 25 and has a head or wall at its rear end formed with a bearing 27 through which is journaled a hollow shaft 28 carrying at its rear or outer end a sprocket wheel 29 about which is engaged the chain 24. This shaft 28 fits loosely about a stub shaft 30 formed at its front end with a disk 31 which has face to face engagement with a disk 32 formed at the end of the power take-off shaft 25 where it is firmly secured by bolts 33 which not only secure the two disks in engagement with each other but also serve to secure the disk 31 in a recess or seat 34 formed in a heavy disk or fly wheel 35. Sets of triple gears 36 are carried by the fly wheel in spaced relation to each other circumferentially and constitute elements of a planetary gearing. While two of the triple gears appear in Figure 3 it is to be understood that three are used and spaced from each other an even distance. Each of the triple gears consists of three gears 37, 38 and 39 which are rotatably mounted by a stub shaft or pin 40 projecting from the fly wheel, it being understood that the gears may be separately formed and securely fastened to each other or formed as a unit. The gear 37 meshes with a gear 41 keyed to the hollow shaft 28 and the gears 38 and 39 mesh respectively with gears 42 and 43 formed about the extended hubs 44 and 45 of drums 46 and 47. The drum 47 and its hub fit loosely about the shaft 28 and the drum 46 and its hub are free to turn about the hub of the drum 47. The gear 37 is smaller in diameter than the gear 38 but larger than the gear 39 and the gears 41, 42 and 43 are also of different sizes from each other so that companion gears mesh properly. Therefore, when the drum 47 is held stationary and the shaft 25 and fly wheel turning rotary motion will be imparted to the triple gears by meshing of the gears 38 with the gear 43 and rotary motion will be transmitted through the medium of the gears 37 and 31 to slowly rotate the shaft 28 and sprocket 29 in one direction whereas when the drum 46 is held stationary and the drum 47 left free to turn the gears 39 by meshing with the gear 43 will impart rotation to the triple gears and rotary motion in a reversed direction will be transmitted to the shaft 28 and sprocket 29 by way of the gears 37 and 41. It will thus be seen that by securing the proper drum against rotation the direction in which the shaft 28 rotates may be controlled and consequently the shaft 18 caused to turn in a direction to swing the levers or crank arms 17 either upwardly or downwardly and raise or lower the blade.

In order to selectively hold the drums stationary the drums are encircled by bands 48 and 49 having ears at their ends through which pass rods 50 and 51. These rods are each rigidly secured at one end through a side wall of the transmission housing by a nut 52 and each carries abutment collars 53 which may be nuts and are spaced from each other so that the ear at one end of a band may be disposed between the abutment collars. The other end portion of each rod is slidably received in a cap or plunger 54 which projects through the opposite side wall of the housing 26 and springs 55 are provided about the rods between the ears at opposite ends of the bands so that the bands will be normally held expanded and out of gripping engagement with the drums. Pressure upon the outer end of a cap will force it inwardly in opposition to action of the spring carried by the companion rod and the band will be contracted about the drum to tightly grip the drum and prevent rotation thereof. This inward movement of the caps is selectively effected by a cam plate 56 pivotally mounted as shown at 57 and having semicircular arms 58 and 59 which bear against the caps of the two rods and when the plate is swung about the pivot fastener in a predetermined direction a selected one of the caps will be forced inwardly and the desired band tightened about the companion drum. An arm 60 projects upwardly from the outer end portion of the cam plate and at its upper end is secured to the rear end of a link or strip 61 which extends longitudinally of the tractor at one side thereof and at its front end is secured to a lever 62 mounted vertically in such a position that it can be easily grasped by the operator of the tractor who occupies the seat 63. It will thus be seen that the operator of the tractor may easily cause the blade to be raised or lowered and the blade will remain in the adjusted position. As the springs 13 exert pull upon the levers 9 strain upon the gears, sprocket chain and pivot fasteners back of the levers will be removed and the weight of the blade and side bars will not cause damage to these parts.

Having thus described the invention, what is claimed is:

1. In combination with a tractor, a scraping blade in front of said tractor, bars extending rearwardly from said blade and pivotally mounted at sides of the tractor, stems rising from said bars and having threaded upper end portions, levers pivotally mounted at opposite sides of the tractor back of said stems, arms projecting forwardly from said levers and slidably fitting about said stems, the stems being shiftable vertically through the arms, springs coiled about the stems between the arms and lower ends of the stems for resisting upward movement of the stems through the arms and absorbing shocks, nuts threaded upon the upper ends of said stems and engaging said arms to compress and tension said springs, means for shifting the levers rearwardly to vertically adjust the bars and blade, and resilient means for yieldably resisting forward movement of the levers.

2. In combination with a tractor having a power take-off shaft at its back, a blade extending transversely of the tractor at the front thereof, and having rearwardly extending arms pivoted to the tractor, levers for adjusting the arms vertically and maintaining the blade in an adjusted position, a shaft extending transversely of the tractor back of said levers and rotatably mounted, crank arms carried by said shaft and connected with said levers, a worm gear carried by said shaft, a worm meshing with said worm gear, a transmission shaft aligned with the power take-off shaft of the tractor, means for transmitting rotary motion from the transmission shaft to said worm, and transmission gearing between the power take-off shaft and transmission shaft for selectively controlling directional rotation of the transmission shaft and effecting rotation of the worm and first shaft in a predetermined direction to vertically adjust the blade.

3. The structure of claim 2 wherein the transmission shaft and gearing are mounted in a housing secured to the tractor about the rear end portion of the power take-off shaft, said gearing including drums and bands about the drums to selectively hold the drums stationary when tightened, and means for tightening said bands comprising rods carried by said housing and extending transversely thereof through ears at ends of the bands, springs about said rods between the ears of the bands to normally hold the bands expanded and out of gripping engagement with the drums, caps slidably mounted upon said rods and each having one end bearing against an ear at one end of a band, and means for selectively forcing the caps longitudinally in a direction to contract the bands about the drums and hold a selected one of the drums stationary.

4. The structure of claim 2 wherein the transmission shaft and gearing are mounted in a housing secured to the tractor about the rear end portion of the power take-off shaft, said gearing including drums and bands about the drums to selectively hold the drums stationary when tightened, and means for tightening said bands comprising rods carried by a side wall of the housing and extending transversely of the housing through ears at ends of the bands, abutments carried by said rods and each engaging an ear at one end of a band, springs about the rods between ears of the bands and yieldably holding the bands expanded to release the drums, caps slidable upon said rods and projecting through the other side wall of the housing with their inner ends contacting with ears at opposite ends of the bands from the abutments, a cam plate pivotally mounted externally of the housing and having arms contacting with outer ends of the caps, and means for turning the cam plate about its pivot to force a predetermined cap inwardly to tighten a selected band about the companion drum and effect rotation of the transmission shaft in a desired direction.

JOHN H. GREENE.